US008281259B2

(12) United States Patent
Milic-Frayling et al.

(10) Patent No.: US 8,281,259 B2
(45) Date of Patent: Oct. 2, 2012

(54) INTELLIGENT BACKWARD RESOURCE NAVIGATION

(75) Inventors: Natasa Milic-Frayling, Cambridge (GB); Samuel Gavin Smyth, Huntingdon (GB); Kerry Rodden, Palo Alto, CA (US); Ralph Sommerer, Cambridge (GB); Rachel Jones, Cambridge (GB); Alan Frank Blackwell, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 68 days.

(21) Appl. No.: 12/839,390

(22) Filed: Jul. 19, 2010

(65) Prior Publication Data

US 2010/0306665 A1 Dec. 2, 2010

Related U.S. Application Data

(63) Continuation of application No. 10/839,924, filed on May 5, 2004, now Pat. No. 7,774,721.

(60) Provisional application No. 60/529,823, filed on Dec. 15, 2003.

(51) Int. Cl.
*G06F 3/048* (2006.01)
*G06F 3/01* (2006.01)

(52) U.S. Cl. ........ 715/855; 715/736; 715/738; 715/739; 715/745; 715/853; 715/854

(58) Field of Classification Search .................. 715/736, 715/738, 739, 745, 853, 854, 855
See application file for complete search history.

(56) References Cited

U.S. PATENT DOCUMENTS

| 5,603,034 A | 2/1997 | Swanson |
| 5,727,129 A | 3/1998 | Barrett et al. |
| 5,864,863 A | 1/1999 | Burrows |
| 5,897,670 A * | 4/1999 | Nielsen ......................... 715/866 |
| 6,012,093 A | 1/2000 | Maddalozzo et al. |
| 6,035,332 A | 3/2000 | Ingrassia et al. |
| 6,037,934 A | 3/2000 | Himmel et al. |
| 6,189,018 B1 * | 2/2001 | Newman et al. ............... 715/205 |
| 6,232,972 B1 * | 5/2001 | Arcuri et al. ................... 715/815 |
| 6,243,091 B1 | 6/2001 | Berstis |
| 6,256,028 B1 | 7/2001 | Sanford et al. |
| 6,301,584 B1 | 10/2001 | Ranger |
| 6,310,630 B1 | 10/2001 | Kulkarni et al. |
| 6,353,839 B1 | 3/2002 | King et al. |
| 6,483,525 B1 | 11/2002 | Tange |
| 6,526,440 B1 | 2/2003 | Bharat |
| 6,667,751 B1 | 12/2003 | Wynn et al. |
| 6,670,974 B1 * | 12/2003 | McKnight et al. ............ 715/855 |
| 6,686,918 B1 | 2/2004 | Cajolet et al. |

(Continued)

OTHER PUBLICATIONS

McKenzie, B., Cockburn, A.; "An Empirical Analysis of Web Page Revisitation" HICSS archive Proceedings of the 34th Annual Hawaii International Conference on System Sciences v5, 2001, 9 pgs.

(Continued)

*Primary Examiner* — Nicholas Augustine (57) ABSTRACT

A system for navigating among resources includes a target detection module detecting whether a first resource has been branched from to two other different resources and a backward navigation module operable to detect selection of a backward navigation button and cause navigation to the first resource. A method includes designating a target resource accessible via a backward navigation button in a first browser session, detecting selection of the backward navigation button in a second browser session, and navigating to the target resource in the second browser session. The method can involve detecting hovering of a pointer icon over the backward navigation button and responsively presenting a thumbnail of a resource associated with the backward navigation button.

20 Claims, 9 Drawing Sheets

U.S. PATENT DOCUMENTS

| | | | |
|---|---|---|---|
| 6,754,873 B1 | 6/2004 | Law et al. | |
| 6,892,360 B1* | 5/2005 | Pabla et al. | 715/802 |
| 6,934,912 B2 | 8/2005 | Simpson et al. | |
| 6,952,799 B2 | 10/2005 | Edwards et al. | |
| 7,075,550 B2 | 7/2006 | Bonadio | |
| 7,085,994 B2* | 8/2006 | Gvily | 715/234 |
| 7,111,243 B1* | 9/2006 | Ballard et al. | 715/744 |
| 7,162,471 B1 | 1/2007 | Knight et al. | |
| 7,165,070 B2 | 1/2007 | Page et al. | |
| 7,181,698 B2* | 2/2007 | Shahrbabaki et al. | 715/790 |
| 7,225,407 B2 | 5/2007 | Sommerer et al. | |
| 7,373,614 B1 | 5/2008 | Holmes | |
| 7,421,657 B1 | 9/2008 | Dawson-Granados et al. | |
| 7,614,004 B2 | 11/2009 | Milic-Frayling et al. | |
| 7,617,458 B1 | 11/2009 | Wassom et al. | |
| 7,647,338 B2 | 1/2010 | Lazier et al. | |
| 7,774,721 B2 | 8/2010 | Milic-Frayling et al. | |
| 7,962,843 B2 | 6/2011 | Milic-Frayling et al. | |
| 2001/0034742 A1 | 10/2001 | Stinson | |
| 2002/0010715 A1 | 1/2002 | Chinn et al. | |
| 2002/0060701 A1 | 5/2002 | Naughton et al. | |
| 2002/0078043 A1 | 6/2002 | Pass et al. | |
| 2002/0091732 A1 | 7/2002 | Pedro | |
| 2002/0103824 A1 | 8/2002 | Koppolu et al. | |
| 2002/0120619 A1 | 8/2002 | Marso et al. | |
| 2002/0143864 A1 | 10/2002 | Page et al. | |
| 2002/0147796 A1 | 10/2002 | Chung | |
| 2002/0191015 A1 | 12/2002 | Brown et al. | |
| 2003/0046366 A1 | 3/2003 | Pardikar et al. | |
| 2003/0122865 A1 | 7/2003 | Lake et al. | |
| 2003/0132957 A1 | 7/2003 | Ullmann et al. | |
| 2003/0200505 A1 | 10/2003 | Evans | |
| 2004/0001092 A1 | 1/2004 | Rothwein et al. | |
| 2004/0003351 A1 | 1/2004 | Sommerer et al. | |
| 2004/0064438 A1 | 4/2004 | Kostoff | |
| 2004/0143564 A1 | 7/2004 | Gross et al. | |
| 2004/0148591 A1 | 7/2004 | Kumhyr et al. | |
| 2004/0193699 A1 | 9/2004 | Heymann et al. | |
| 2005/0021494 A1 | 1/2005 | Wilkinson | |
| 2005/0033657 A1 | 2/2005 | Herrington et al. | |
| 2005/0086613 A1 | 4/2005 | McKnight et al. | |
| 2005/0114798 A1 | 5/2005 | Jiang et al. | |
| 2005/0132018 A1 | 6/2005 | Milic-Frayling et al. | |
| 2005/0132296 A1 | 6/2005 | Milic-Frayling et al. | |
| 2005/0273718 A1 | 12/2005 | Naas | |
| 2006/0031214 A1 | 2/2006 | Solaro et al. | |
| 2006/0074873 A1 | 4/2006 | Dettinger et al. | |
| 2006/0112178 A1* | 5/2006 | Van Vleet et al. | 709/224 |
| 2006/0271526 A1 | 11/2006 | Charnock et al. | |
| 2007/0067297 A1 | 3/2007 | Kublickis | |
| 2007/0118533 A1 | 5/2007 | Ramer et al. | |
| 2007/0250492 A1 | 10/2007 | Angel et al. | |
| 2008/0033919 A1 | 2/2008 | Arrouye et al. | |
| 2008/0059453 A1 | 3/2008 | Laderman | |
| 2008/0201315 A1 | 8/2008 | Lazier et al. | |
| 2009/0094216 A1 | 4/2009 | Hou et al. | |
| 2009/0177381 A1 | 7/2009 | Taniguchi et al. | |

OTHER PUBLICATIONS

Milic-Frayling, N., Sommerer, R., Tucker, R.; "MS WebScout: Web Navigation Aid and Personal Web History Explorer", In Proceedings of WWW2002 Honolulu, Hawaii, May 2002, 6 pages.

Milic-Frayling, N., Sommerer, R., Rodden, K.; "WebScout: Support for Revisitation of Web Pages Within a Navigation Session", IEEE/WIC International Conference on Web Intelligence Halifax, Canada, Oct. 2003, 5 pages.

Tauscher, L., Greenberg, S.; "How People Revisit Web Pages: Empirical Findings and Implications for the design of History Systems", International Journal of Human-Computer Studies, v47, 1997, pp. 97-137.

U.S. Appl. No. 10/839,924, Including O/As dated May 23, 2007; Nov. 19, 2007; Apr. 30, 2008; Nov. 14, 2008; May 27, 2009; Nov. 16, 2009; and Apr. 2, 2010.

U.S. Appl. No. 10/839,910, Including O/As dated Jun. 26, 2008; Dec. 12, 2008; Aug. 19, 2009; Feb. 24, 2010; Jul. 22, 2010; Jan. 3, 2011; and Mar. 18, 2011.

U.S. Appl. No. 10/839,903, Including O/As dated Apr. 30, 2008; Dec. 1, 2008; and May 1, 2009.

U.S. Appl. No. 11/677,180, Including O/As dated Dec. 2, 2008; May 19, 2009; Jul. 30, 2009; and Oct. 20, 2009.

Foulonneau, Muriel et al.; "Using collection descriptions to enhance an aggregation of harvested item-level metadata"; ACM; 2005; pp. 32-41.

Kherfi, M.L. et al.; "Image retrieval from the world wide web issues, techniques, and systems"; ACM Computing Surveys; vol. 36, No. 1; Mar. 2004; pp. 35-67.

Funkhouser, Thomas et al.; "Shape-based retrieval and analysis of 3D models"; ACM; Aug. 2004; PDF pp. 1-62.

Tangelder, J. et al.; "A Survey of Content Based 3D Shape Retrieval Methods"; ACM; Aug. 2004; pp. 1-12.

Shilane, P. et al.; "The Princeton Shape Benchmark"; ACM; Aug. 2004; pp. 1-12.

Funkhouser, Thomas, et al.; "A Search Engine for 3D Models"; ACM; Aug. 2004; pp. 1-28.

Min, P. et al.; "Early Experiences with a 3D Model Search Engine"; ACM; Aug. 2004; pp. 1-12.

Hilaga, M. et al.; "Topology Matching for Fully Automatic Similarity Estimation of 3D Shapes"; ACM; Aug. 2004; pp. 203-212.

"Girafa" Internet Web Site Published at www.girafa.com, at least as early as Jan. 2004.

"Opera" Internet Web Site, Features and Functions Published at http://www.opera.com/features/, at least as early as Mar. 2004.

"Apple—Safari" Internet Web Site, Published at http://www.apple.com/safari/, at least as early as Mar. 2004.

Ayers, E. Z., Stasko, J. T.; "Using Graphic History in Browsing the World Wide Web", Technical Report GIT-GVU-95-12, May 1995, 14 pages.

Catledge, L. D., Pitkow, J. E.; "Characterizing Browsing Strategies in the World-Wide Web", Computer Networks and ISDN Systems v26 n6, Dec. 1998 pp. 1065-1073.

Cockburn, A., McKenzie, B., Jasonsmith, M.; "Pushing Back: Evaluating a New Behaviour for the Back and Forward Buttons in Web Browsers", International Journal of Human-Computer Studies.

Cockburn, A., Greengberg, S., McKenzie, B., Jasonsmith, M, Kaasten, S.; "WebView: A Graphical Aid for Revisiting Web Pages" In 'Proceedings of the OZCHI'99 Australian Conference on Human Computer Interaction', Nov. 1999, 6 pages.

Cockburn, A., Jones, S.; "Which Way Now? Analysing and Easing Inadequacies in WWW Navigation" International Journal of Human-Computer Studies v45 i1, Jul. 1996, pp. 105-129.

Cockburn, A., McKenzie, B.; "What do Web Users Do? An Empirical Analysis of Web Use" International Journal of Human-Computer Studies v54 i6, Jun. 2001, pp. 903-922.

Greenberg, S., Cockburn, A.; "Getting Back to Back: Alternate Behaviors for a Web Browsers Back Button" In Proceedings of the 5th Annual Human Factors and the Web Conference held at NIST, Gaithersburg, Maryland, Jun. 1999, 8 pgs.

Kaasten, S., Greenberg, S.; "Integrating Back, History and Bookmarks in Web Browsers" In Extended Abstracts of the ACM Conference of Human Factors in Computing Systems, ACM Press, 2001, pp. 379-380.

* cited by examiner

INTELLIGENT BACKWARD RESOURCE NAVIGATION

RELATED APPLICATIONS

This patent application is a continuation of U.S. patent application Ser. No. 10/839,924, filed on May 5, 2004, that claims priority from U.S. Provisional Patent Application Ser. No. 60/529,823, filed on Dec. 15, 2003, which is incorporated herein by reference for all that it discloses. This patent application is also related to co-owned U.S. patent application Ser. No. 10/839,903 and to U.S. patent application Ser. No. 10/839,910, both of which are incorporated herein by reference for all that they disclose.

TECHNICAL FIELD

The described subject matter relates to resource browsing, and more particularly to systems and methods for smart backward resource navigation.

BACKGROUND

A browser is a computer application program that enables a computer user to view (i.e., browse) web pages and other resources. The user specifies a resource identifier, such as a universal resource identifier (URI), which directs the browser to the specified resource. Typically, as the user browses resources, the browser maintains a history of visits to resources that have been visited, and provides tools whereby the user can access the history to re-visit certain resources. Ideally, the history and the tools would enable the user to quickly re-visit preferred resources. Unfortunately, the tools offered by current browsers to re-visit preferred resources are often time consuming or confusing to use.

For example, most browsers employ a "back" button. If the user selects the "back" button, the browser returns to the previous resource most recently visited during the current browsing session. A browsing session refers to resource browsing that occurs between the time a browser is launched and when the browser is closed. Thus, the traditional "back" button does not allow a user to access a history of resource visits across multiple sessions.

In addition, the traditional "back" button does not distinguish between a visit to one resource and a visit to another in terms of user preference. Therefore, if the user browses many resources, and then wants to return to a resource that was previously visited early in the session, the user must repeatedly select the "back" button many times through intervening visits to resources to get back to the desired resource. Such repeated selection of the "back" button can be time consuming, and can be confusing to the user if the user does not readily recognize the resource that he/she wants. Furthermore, the traditional navigation stack used by the traditional back button replaces a prior navigation path branching from a resource with a subsequent navigation path branching from the same resource. As a result, the traditional back button will not allow a user to navigate back certain paths when multiple paths branch from a resource visit.

Some browsers do maintain inter-session histories (histories available across browser sessions) and tools to access those histories. For example, INTERNET EXPLORER by MICROSOFT, provides History, a list of all the visited resource visits up to a point in the past, often determined by the memory storage constraints. These can be used to search for a resource seen on a particular date. However, this is not closely integrated with the current resource navigation session and lacks details of the navigation information and resource descriptions. Consequently it takes a considerable amount of time to identify the desired resource in the list. Similarly, INTERNET EXPLORER by MICROSOFT provides a "Favorites" menu item, with which a user can designate a currently visited resource as a favorite and later return to that resource in the same session or another session. Although "Favorites" provides some level of historical recall by listing the resources that have been visited in the past, the feature is not highly effective in supporting revisitation of a resource. The reason is that users tend to fill the favorites list or tree type directory with many resources and it becomes difficult for the user to later locate the favorite resource identifier in the list or directory. In some instances, it may take the user longer to locate the favorite resource in the "Favorites" than it would be to find the resource by some other means (e.g., a search engine).

An "autocomplete" function also tends to obviate the "Favorites" and "History". "Autocomplete" is a function that automatically completes a resource identifier as the identifier is being typed. As the user types in the identifier, the "autocomplete" finds one or more previously visited resource identifiers that match the identifier being typed in and presents the matching identifier(s) to the user. A user who remembers the first few symbols in a resource identifier can begin typing the symbols, and then select one of the identifiers presented by the "autocomplete" function. Often, a user will opt for the "autocomplete" function instead of looking up the resource identifier, i.e., URI in the long "History" list or the "Favorites" list when it is overly populated. Unfortunately, the "autocomplete" function is not a complete solution because it requires that the user remember symbols in the resource identifier.

Another tool often provided by browsers is the "Address Dropdown" menu which simply presents a list of resource identifiers, typically URIs, of previously typed-in resources. Even after a relatively short browsing session, the "Address Dropdown" tools can be filled with a large number of typed-in resource identifiers. Users are often confused by such long lists of identifiers, and can spend a lot of time searching such lists for previously visited resources since the user may not correctly remember the precise URL of the desired resource. In addition, the resource identifiers are typically not presented in any particular order or with any preference information that may assist the user in quickly identifying a desired resource that was previously visited.

As such, traditional browsing tools are not as robust as they could be in enabling a user to quickly and efficiently locate preferred resources that have been visited before.

SUMMARY

Implementations are described and claimed herein to enable a user to quickly and efficiently locate preferred resources that were previously visited. Implementations utilize an "intelligent backward" resource navigation scheme that analyzes a user's resource navigation history that includes a sequence of resource identifiers corresponding to the visited resources. A visit to a resource is specified by the resource identifier and resource identifier's position in the navigation sequence, where the sequence is typically based on temporal order of navigation. An "intelligent backward" navigation scheme analyses resource visits in the navigation history and determines backward navigation targets (i.e., target resources in the previous navigation sequence). The target resources can be marked and presented to the user in a number of ways, thereby allowing the user to quickly return to a desired resource without navigating to previously visited intervening resources.

An implementation of a system for navigating among resources includes a target detection module detecting whether a first resource has been branched from to two different resources and a backward navigation module operable to detect selection of a backward navigation button and cause navigation to the first resource. The backward navigation module is operable to detect whether a pointer icon is being hovered over the backward navigation button and responsively cause a thumbnail of the corresponding resource to be presented.

An implementation of a method includes designating a backward navigation target via a backward navigation button in a first browser session, detecting selection of the backward navigation button in a second browser session, and navigating to the backward navigation target in the second browser session. The method can involve detecting hovering of a pointer icon over the backward navigation button and responsively presenting a thumbnail of a resource associated with the backward navigation button.

In some implementations, articles of manufacture are provided as computer program products. One implementation of a computer program product provides a computer program storage medium readable by a computer system and encoding a computer program for intelligent backward resource navigation. Another implementation of a computer program product may be provided in a computer data signal embodied in a carrier wave by a computing system and encoding the computer program for intelligent backward resource navigation.

The computer program product encodes a computer program for detecting a press and release of a backward navigation button during a first browser session and responsively navigating to a resource that was not visited during the first browser session. The process may further include detecting hovering of a pointer icon over the backward navigation button and responsively presenting a thumbnail of the resource.

DETAILED DESCRIPTION

Overview

Briefly, intelligent backward resource navigation targets visited resources for navigating back to those resources based on an analysis of the resource visits, including the manner in which they were visited. Many resource visits are to resources that a user has visited in the past. On the Internet, for example, users commonly drill down a branch of a hypertext hierarchy in search of interesting data, only to "back" (e.g., using the Back button) up the hierarchy to a branching point from which to navigate down another path.

One method of simplifying the user's navigation in such circumstances is to provide an intelligent backward navigation feature in the browser, which backs the user up to defined target points in the navigation. Five exemplary intelligent backward navigation targets are: (1) typed-in or auto-completed uniform resource identifiers (URIs) in the address box; (2) URIs of resources accessed from a favorites list, address drop-down list, or similar; (3) "hubs," which are automatically marked navigation targets resulting from a "revisit and branch" navigation; (4) automatically marked navigation targets resulting from a form "submit"; and (5) URIs that match a particular pattern or those explicitly marked as target by the user. Intelligent backward navigation involves navigating back to an intelligent backward target in the navigation history, while skipping intervening navigation points.

Exemplary System

Figure 1:
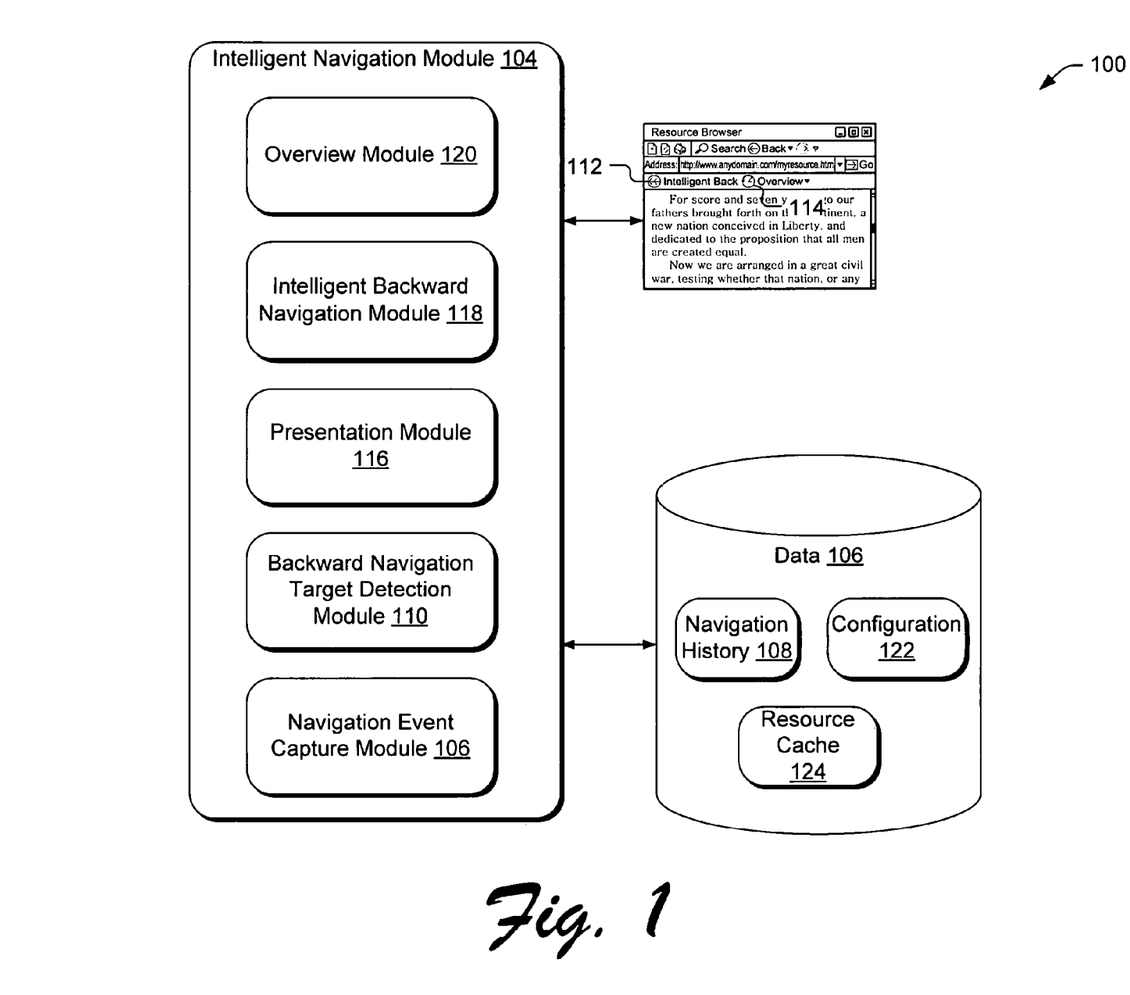
FIG. 1 illustrates an exemplary operating environment in which intelligent backward navigation can be carried out.

FIG. 1 illustrates an exemplary operating environment 100 in which intelligent backward navigation can be carried out. In general, a resource browser window 102 is presented, through which a user can visit or access resources. As used herein, the terms "visiting a resource" and "accessing a resource" both refer to navigating to a resource through a resource browser window. As used herein, a resource refers any uniquely addressable resource accessible by a browser application program (or simply "browser"), such as, but not limited to, a document (e.g., Portable Data Format (pdf) document, WORD document), or a Web page. A resource can include various forms of media, such as, but not limited to, video, audio, text, and images. A resource can be remote or local to the computer that is browsing the resource.

Browser session may refer to the instance of the browser application, possibly with multiple browser windows, with end of session being associated with closing of all associated browser window instances. Alternatively, browser session may be defined as a sequence of user browsing activities with the session start and the session end defined in terms of navigation activities. For example, end of a session may be determined by the minimum duration of inactivity in resource navigation by the user.

An intelligent navigation module 104 facilitates intelligent resource navigation based on user input and a navigation history, including a sequence of visits to resources. Each resource is identified by a resource identifier (e.g., uniform resource identifiers (URIs), resource titles or other resource labels) and each visit to a resource is specified by the resource identifier and a position in the navigation sequence. The intelligent navigation module 104 can be implemented in different ways. For example, the intelligent navigation module 104 can be built into a browser application program (not shown). Alternatively, the intelligent navigation module 104 can be a stand-alone application (e.g., a plug-in or applet) that extends the capabilities of the browser application module. As shown, the intelligent navigation module 104 includes a number of modules that manage the intelligent target navigation presentation, detection, and event capture.

While the user navigates, a navigation event capture module 106 detects and logs information about visited resources in a resource navigation history 108. The navigation history 108 is stored in data store 108. The navigation history 108 includes visited resource identifiers, order of resource visitation, resource branching information and other information. Resource branching information indicates how resources were accessed by branching from other resources.

A target detection module 110 identifies and designates resource identifiers in the navigation history 108 as backward navigation targets based on user input and information in the navigation history 108. Through a browser interface (not shown), the user can designate particular resources and resource visits as backward navigation targets. The target detection module 110 marks the user-designated resource identifiers as targets in the navigation history.

In addition, the target detection module 110 automatically identifies and designates backward navigation targets based on user navigation. By way of example, the target detection module 110 detects when the user types in a resource identifier (or when a typed resource identifier is auto-completed), detects when the user selects a resource identifier from the favorites list (i.e., previously stored list of preferred resources), detects when results have been received in response to a form submission (e.g., an Internet search), and detects a hub node in the navigation history. A hub resource (or simply "hub") is a resource that corresponds to the hub node. A hub navigation node is created when the user navigates to a resource and, from that resource branches to at least two other different resources. A target resource is a resource that corresponds to the backward navigation target. A target resource visit specifies a particular visit to a target resource. Thus, a target resource visit can be specified by the resource's URI and a location in the navigation sequence at which the resource was visited.

When the target detection module 110 identifies a backward navigation target, either user-designated, or automatically detected, the target detection module 110 designates a resource visit as a backward navigation target in the navigation history 108. Designating the backward navigation target involves marking or in some way distinguishing the target resource identifier within the navigation history. Marking the target resource can be done by setting a flag or setting data equal to a predetermined value indicating that the resource is a target, or using other techniques as may be known in the art. The resource can be marked as the target permanently, or as associated with the particular visit in the navigation history.

The resource identifier, corresponding to the resource visit or resource in general can be unmarked as a target (changing the status to an ordinary resource or visit) automatically based on a predefined criteria or manually by the user. Exemplary criteria for unmarking the target resource identifier is a specified time period after which the resource is no longer considered a backward navigation target. Similarly, a target resource can be considered a backward navigation target only within a particular navigation path.

After backward navigation targets have been designated in the resource navigation history 108, the user can navigate to the targets using controls on the resource browser window 102, such as an intelligent backward navigation button 112 or an overview button 114. A presentation module 116 performs processing for rendering the intelligent backward navigation button 112 and the overview button 114, as well as processing for rendering other controls discussed below that relate to the overview and intelligent backward navigation. In one implementation the intelligent backward navigation button is labeled with the resource identifier, e.g., the resource title or hyperlink pointing to the resource.

An intelligent backward navigation module 118 handles processing related to the intelligent backward navigation button 112. In general, the intelligent backward navigation module 118 implements the intelligent backward navigation button behavior. More specifically, the intelligent backward navigation module 118 detects selection of the intelligent backward navigation button. As is discussed in more detail below, an intelligent backward navigation button, including the button name or resource identifier shown as a button label, can be "clicked on" or "hovered over". The intelligent backward navigation module 118 responds to both types of button selection. If the intelligent backward navigation button 112 is clicked on, the intelligent backward navigation module 118 selects a target resource identifier from the navigation history 108 and causes the browser application program to navigate to the selected target resource.

The term "click" refers to a press and release of a button on a mouse or other pointing device. A "click" generates an event, specifying the screen position, which is processed by the intelligent backward navigation module 118. Hovering over a button occurs when the pointer icon (not shown) is positioned over the button for a specified length of time. Hovering also generates an event, specifying the screen location, which is processed by the intelligent backward navigation module 118. When the intelligent backward navigation module 118 detects hovering over an intelligent backward navigation icon, the button name, or resource identifier used as the button label, the intelligent backward navigation module 118 can cause a thumbnail of an associated resource to be presented. Presentation of resource thumbnails in response to hovering is discussed in more detail below with respect to FIG. 6.

In one embodiment, activation of the intelligent navigation button is facilitated by using a keystroke shortcut. In another embodiment the user can use the sequence of Tab key and Enter key to activate the intelligent resource navigation button.

An overview module 120 handles processing related to the overview button 114. In general, the overview module 120 implements the behavior of the overview button. Thus, the overview module 120 detects selection of the overview button and responsively causes an overview of the resource identifiers visited in the browser session to be presented. The overview of the browser session can be presented in different ways, including a temporal format and a domain-name grouped format. The overview module 120 and overview button 114 are discussed in greater detail in related U.S. patent application Ser. No. 10/839,910.

In addition to the navigation history 108, the data store 106 stores configuration data 122. Configuration data 122 includes settings that can be selected by the user for intelligent backward navigation and browser session overview. Configuration data 122 can be entered through a configuration window such as the configuration window shown in, and described with respect to, FIG. 4 below.

The data store 106 also includes a resource cache 124 for caching resources that have been visited. When a resource is visited, the contents of the resource are stored in the resource cache 124 for later use. The cached resource contents can be used later when a previously visited resource is re-visited, or when a thumbnail of the resource is generated as discussed below. The resource contents in the resource cache 124 can be updated periodically or continually during a current browser session or another browser session.

Data stored in the data store 106 is persistent across browser sessions. Thus, whenever the user closes the browser application program, the navigation history 108 and the configuration data 122 are stored. When another session of the browser application program is started later, the previously stored navigation history 108 and configuration data 122 are used. As a result, backward navigation targets from a current or previous browser session in the navigation history 108 can be accessed via the intelligent backward navigation button 122 in a later browser session.

Figure 2:
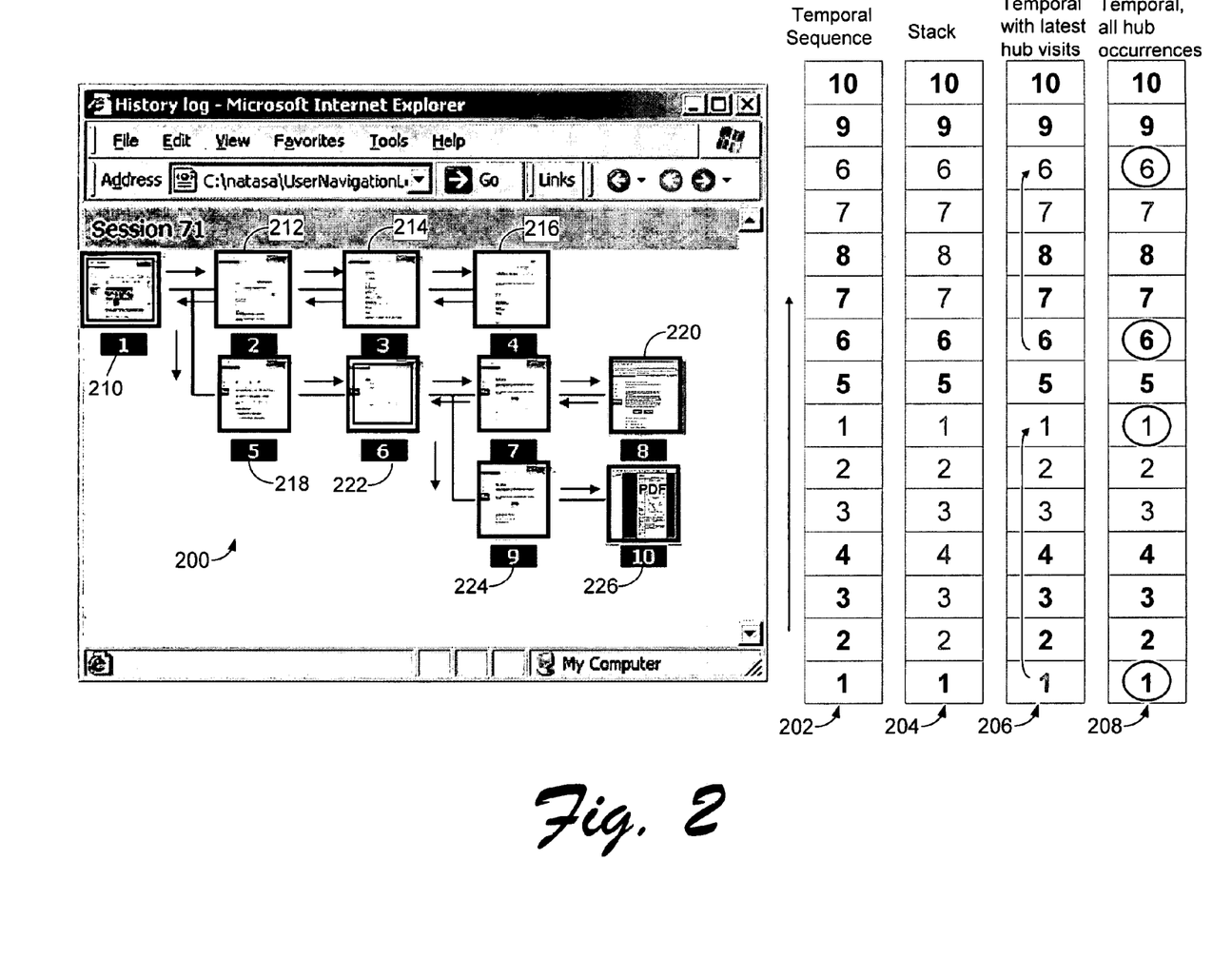
FIG. 2 illustrates an exemplary navigation map and exemplary resource navigation histories associated with the map.

FIG. 2 illustrates an exemplary navigation map 200 and exemplary navigation data histories 202, 204, 206, and 208 for keeping track of the resource navigation history. The navigation map 200 includes ten resources that have been visited. These resources are numbered sequentially from one to ten and presented as small resource page icons in a tree structure according to the manner in which the resources were visited.

To illustrate, resource 1 (210) was visited first. From resource 1 (210), the user branched to resource 2 (212), for example, by clicking on a hyperlink embedded in resource 1 (210). From resource 2 (212), navigation proceeds to resource 3 (214) and resource 4 (216). Using a traditional back button, the user "backs up" the navigation path sequentially from resource 4 (216) to resource 1 (210). Once again at resource 1 (210), the user branches to resource 5 (218). Navigation proceeds sequentially from resource 5 (218) to resource 8 (220) via resource 6 (222). From resource 8 (220), navigation "backs up" sequentially to resource 6 (222). Navigation branches from resource 6 (222) to resource 9 (224) and ends at resource 10 (226).

The navigation map 200 may be represented by one of the four exemplary navigation data histories 202, 204, 206, and 208. Navigation data histories include navigation nodes corresponding to visits to the resources shown in the navigation map 200. A navigation data history can be stored in memory and used to navigate backward or forward along a navigation path. Each of the navigation data histories, 202, 204, 206, 208 represents the navigation map 200 differently.

The navigation data histories 202, 204, 206, and 208 are presented only to illustrate the concept of storing resource identifiers at particular positions in the histories so that the resources can be re-visited. The navigation data histories 202, 204, 206, and 208 could serve as exemplary implementations of a navigation history (e.g., navigation history 108, FIG. 1). In an actual implementation, the navigation resource histories would be implemented in computer-readable data structures and could include information in addition to the resource identifiers. In addition, in an actual implementation, the resource identifiers would be resource names, uniform resource identifiers (URIs), uniform resource locators (URLs), or other identifiers, rather than numbers. Resource numbers are used in FIG. 2 for illustrative purposes only.

A pure temporal history 202 stores all the resource identifiers (i.e., numbers one through ten) in the order in which the resources were visited. While the pure temporal history 202 is useful because it provides the most information of all the types of histories, the pure temporal history requires the most memory. In addition, the pure temporal history 202 results in the largest number of traditional "back button clicks" when the user wants to navigate back up a navigation path to a previously visited resource. For example, if the user wants to navigate from resource 10 (226) back to resource 4 (216), using the traditional back button will require eleven button clicks.

By contrast, a stack-based navigation history 204 does not include many of the previously visited resource identifiers. The stack-based navigation history 204 uses a "push" and "pop" scheme to add and remove resource identifiers from the history 204. The stack-based navigation history 204 removes (pops) resource 2 (212), resource 3 (214), and resource 4 (216) when navigation branches from resource 1 (210) to resource 5 (218). Similarly, resource 7 and resource 8 (220) are removed from the stack-based navigation history 204 when navigation branches from resource 6 (222) to resource 9 (224). As illustrated, the removed resources are shown as grayed out in the stack-based navigation history 204. As a result, using a traditional back button and the stack-based navigation history 204, the user cannot navigate backward to resource 2 (212), resource 3 (214), resource 4 (216), resource 7, and resource 8 (220) from resource 10 (226).

Another type of navigation history is the temporal with latest hub visits (TLHV) history 206. The TLHV history 206 stores visited resource identifiers temporally. The TLHV history 206 maintains only the latest visit of any hubs as well as one (e.g., the first) instance of visits to each other resource in the map 200. The TLHV history 206 does not duplicate certain resource identifiers that are unnecessary. For example, because resource 7 can be visited from resource 8 (220), resource 7 is not duplicated in the TLHV history 206 on both sides of resource 8 (220). When navigation branches from resource 1 (210) the second time to resource 5 (218), the first visit to resource 1 (210) is removed from the TLHB history 206.

Another history, the temporal with all hub visits (TAHV) history 208, is similar to the TLHV history 206, except that the TAHV history 208 does not remove prior instances of hub visits. Thus, resource 1 (210) and resource 6 (220), both of which are hubs, are maintained on the TAHV history 108 (as shown by the circled numbers 1 and 6 in the TAHV history 208. The TLHV history 206 and the TAHV history 208 reduce the amount of navigation data as compared to the pure temporal history 202, but retain enough navigation data that all the visited resources can be revisited using a back button, unlike the traditional history 204.

In addition, any hubs are marked as backward navigation targets in the TAHV history 208 and the TLHV history 206 so that intelligent backward navigation can be used to quickly access the hubs. With the TAHV history 208 and the TLHV history 206, visited resources can be intelligently navigated to without visiting intervening resources in a navigation path. For example, if the browser is currently at resource 10 (226), by clicking once on an intelligent backward navigation button, the browser navigates directly to resource 6 (222) without visiting resource 9 (224). Intelligent backward navigation is discussed in detail with respect to a number of exemplary browser window illustrations that follow.

Another type of navigation history is a temporal with earliest hub visits (TEHV) (not shown). The TEHV history is somewhat similar to the TLHV history 206 described above; however, the TEHV history keeps a resource identifier at a place in the history corresponding to only the earliest visit to the associated resource.

Exemplary Browser Window Features

Figure 3:
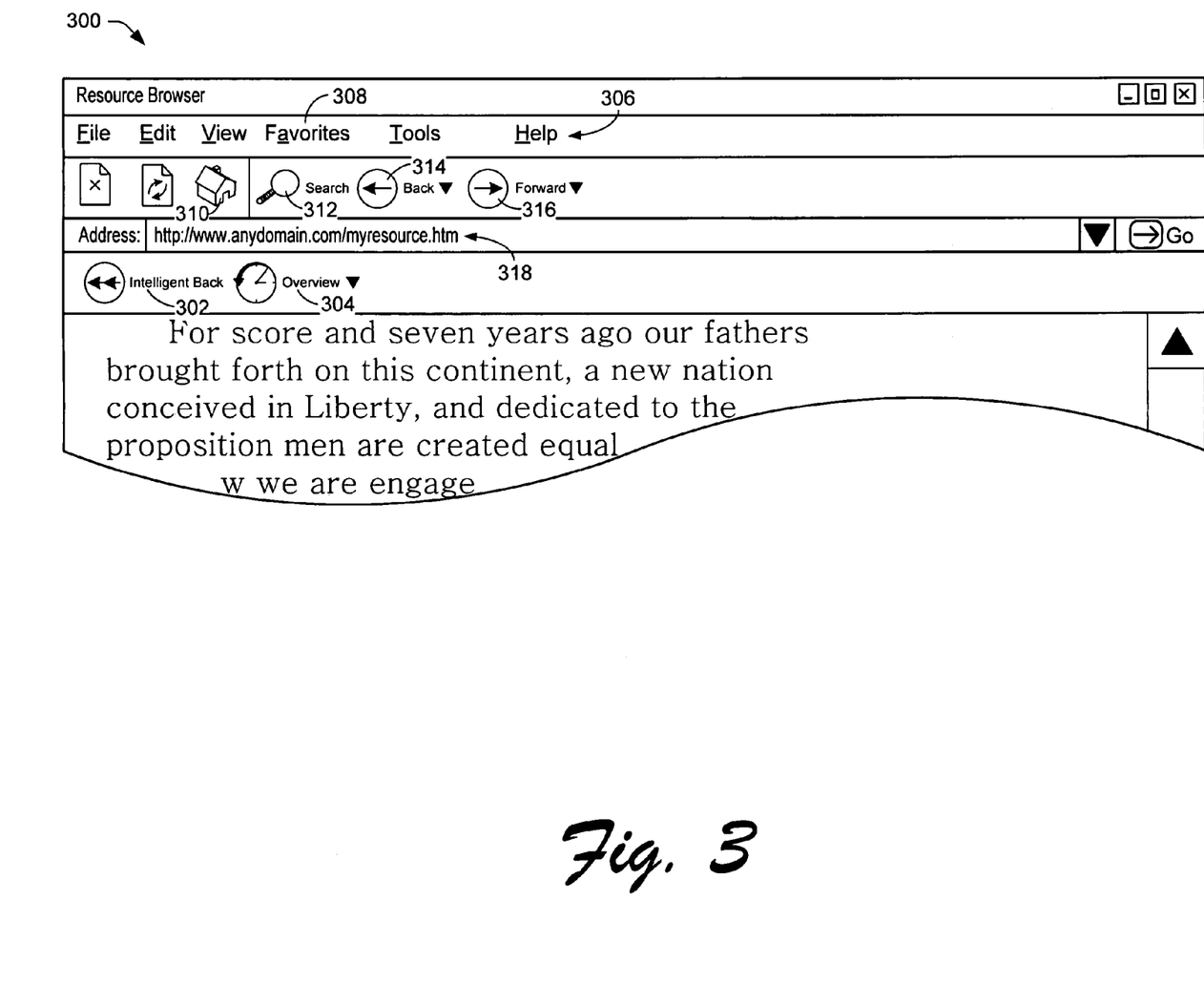
FIG. 3 illustrates a portion of a browser window including an intelligent backward navigation button and a browser session overview button.

FIG. 3 illustrates a portion of a browser window 300 that serves as an interface to a browser application program and/or an intelligent navigation module. Unlike traditional browser windows, the browser window 300 includes an intelligent backward navigation button 302 and a browser session overview button 304. The intelligent backward navigation button 302 enables a user to navigate to backward navigation targets that have been designated in the navigation history.

The browser window 300 may also include traditional navigation tools for visiting resources. For example, a menu 306 includes a user selectable list of "favorites" 308, a "home" icon 310 for navigating to a home page, a "search" icon 312 for navigating to a search page, a traditional back button 314, a traditional forward button 316, and an address entry field 318 for manually entering a resource identifier. Some of the traditional navigating tools have certain drawbacks that are noted in the Background section of this application.

When the user selects the intelligent backward navigation button 302, the browser application program navigates to the most recently visited backward navigation target resource. The most recently visited target resource may be a target resource that was visited most recently in a previous browser session. The first resource visited is designated a target resource by default. The user may configure the browser to automatically designate other types of target resources to which the browser will navigate when the intelligent backward navigation button 302 is selected.

Figure 4:
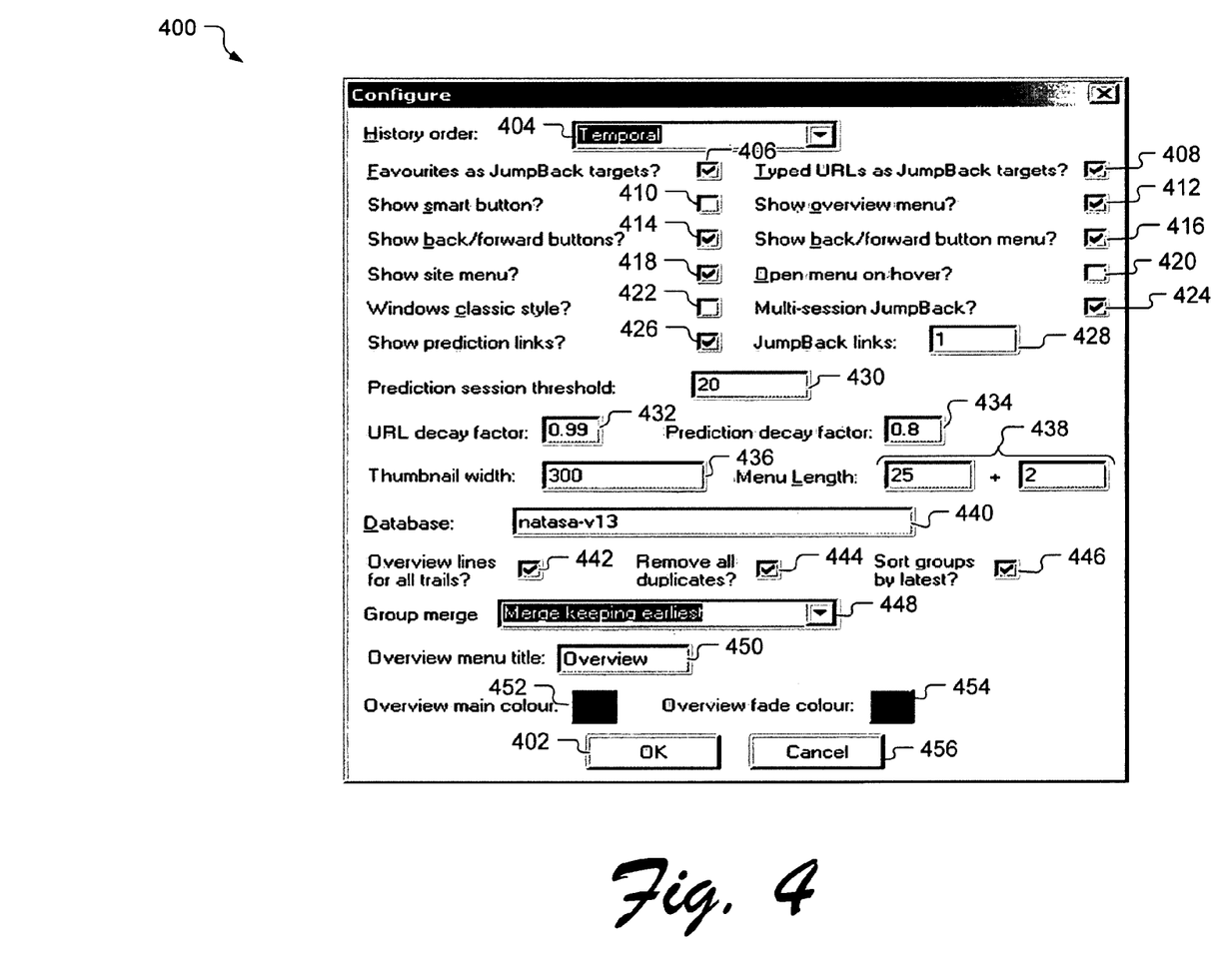
FIG. 4 illustrates a configuration window through which a user can specify various settings related to intelligent navigation, including intelligent backward navigation and browser session overview.

FIG. 4 illustrates a configuration window 400 through which a user can configure the browser. The configuration window 400 can be used to store settings related to a variety of aspects of a browser employing intelligent backward navigation, including presentation of resource identifiers and navigation controls, as well as designation of backward navigation targets. The user may access the configuration window 400 at any time to modify or inspect settings. When the user selects an "OK" button 402, the settings are stored persistently and are used across browser sessions.

With specific reference to the exemplary settings in the configuration window 400, a history order field 404 is used to choose the manner in which the navigation history is presented to the user when the overview button (e.g., overview button 304, FIG. 3) is selected. In a particular implementation of the configuration window 400, the history order can be navigation based (e.g., stack-based, temporal with latest hub visits (TLHV), temporal with all hub visits (TLAV)) or domain-name grouped. For further description of the history order field 404, the reader is referred to related U.S. patent application Ser. No. 10/839,910.

A favorites designation selector 406 enables the user to specify whether, when a favorite resource is navigated to through the favorites list, the favorite resource is designated as a target resource. A typed URL selector 408 enables the user to specify whether a target resource is designated when an associated URL is typed in. A show smart button selector 410 enables a user to specify that the intelligent backward navigation button be displayed or not displayed.

A show overview menu selector 412 enables the user to specify that a menu including the overview button is or is not displayed. A show back/forward buttons selector 414 enables the user to specify that traditional back and forward buttons are or are not displayed. A show back/forward button menu selector 416 enables the user to specify that drop-down menus associated with the traditional back and forward buttons are or are not displayed. A show site menu selector 418 enables the user to specify whether a domain-grouped overview menu is or is not displayed.

An open menu on hover selector 420 enable the user to specify whether the menus enabled using selectors 412, 416, and 418 are or are not opened when the pointer icon is hovered over the button as opposed to when the button is clicked. A WINDOWS classic style selector 422 enables the user to specify whether or not the presentation of the menus, buttons, and other icons are in a WINDOWS classic style.

A multi-session jumpback selector 424 enables the user to specify whether or not intelligent backward navigation is to navigate to target resources designated in previous browser sessions. A show prediction links selector 426 enables the user to specify whether or not smart favorites prediction links are shown in the browser overview presentation. For more information related to the show prediction links selector 426, refer to related U.S. patent application Ser. No. 10/839,903 and U.S. patent application Ser. No. 10/839,910.

Figure 5:
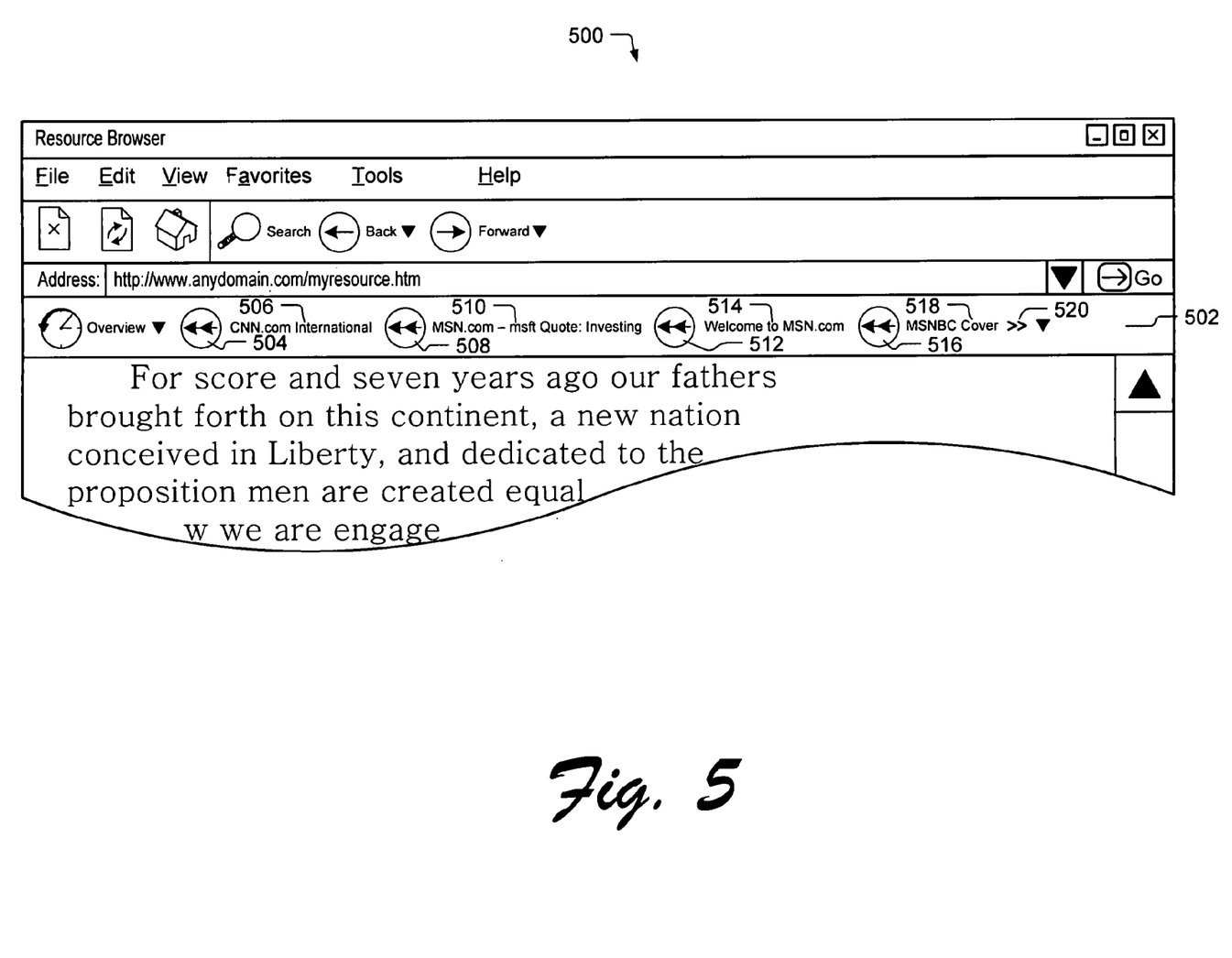
FIG. 5 illustrates another portion of a browser window wherein the intelligent backward navigation targets are presented with intelligent backward navigation buttons on the button bar.

A jumpback links field 428 enables the user to specify a number of intelligent backward navigation targets to be exposed as buttons in the button bar 502 (FIG. 5). A prediction session threshold field 430, URL decay factor field 432, and prediction decay factor field 434 enable the user to specify parameters for predicting intelligent forward navigation, which is discussed in further detail in related U.S. patent application Ser. No. 10/839,903.

A thumbnail width field 436 enables the user to specify the width of thumbnails presented to the user. Menu length fields 438 enable the user to specify the length of the browser window menu corresponding to the session overviews, activated by selector 412 and selector 418.

A database field 440 enables the user to specify a database for storing navigation history and configuration data. An overview lines selector 442 enables the user to specify whether overview lines are to be presented to delimit the links to resources that belong to individual navigation paths in a navigation map or only used to delimit links to resources that have been seen in different browser windows (essentially, indicating the browser window sessions only). A remove all duplicates selector 444 enables the user to specify whether duplicate resource visits are or are not removed from the navigation history. When the remove all duplicates selector 444 is checked, the navigation history will be maintained in a manner such as is shown in the TLHV history 206 (FIG. 2). Conversely, when the remove all duplicates selector 444 is not checked, the navigation history will be maintained in a manner such as is shown in the TAHV history 208 (FIG. 2).

A sort groups by latest selector 446 enables the user to specify whether or not a group of resource identifiers in a common domain are sorted in sequential order according to time of visit, when the resource identifiers are shown in browser session overview. A group merge field 448 enables the user to specify a how to present navigation paths from multiple browser windows. In some instances, a navigation path from one browser window continues in another instance of the browser window, which may have been spawned automatically or initiated by the user. The two groups of links in different windows could be merged to represent a single navigation path or they could be kept separately and the overview will show grouping of links based on window sessions. In one implementation of the configuration window 400, the types of group merges that can be specified are "merge with duplicates," "merge keeping latest," and "merge keeping earliest."

An overview menu title field 450 enables the user to specify the title of the overview menu. An overview main color selector 452 enables the user to specify the main color of the overview menu. An overview fade color selector 454 enables the user to specify the fade color associated with the overview menu, which is used to present links to resources seen in browser windows other that the one displaying the currently viewed resource. For further description of overview menu title field 450, overview main color selector 452, and overview fade color field 454, refer to related U.S. patent application Ser. No. 10/839,910. After the user specifies the configuration settings in the configuration window 400, the user can save the settings by selecting the "OK" button, or cancel (i.e., not save) the settings by selecting a "Cancel" button 456.

FIG. 5 illustrates a portion of a browser window 500 wherein each of a number of backward navigation targets is presented with an associated intelligent backward navigation button (target resource-specific navigation buttons) on a button bar 502, using the target resource identifier (resource name or hyperlink pointing to the target resource) as button label. When the user selects one of the backward navigation target-specific buttons, the browser navigates to the target resource identified by the associated target resource identifiers. Thus, in this implementation, the user can see which target resource will be accessed when an intelligent backward navigation button is selected. Using one of the target-specific navigation buttons, the user can visit a target resource that is not necessarily the most recently visited target resource.

For example, a first target-specific navigation button 504 is associated with and labeled with the resource identifier "CNN.com International" 506. When the user selects the first intelligent backward navigation button 504, the browser navigates to the resource identified by "CNN.com International" 506. Similarly shown are a second target-specific navigation button 508 labeled with resource identifier "MSN.com—msft Quote:Investing" 510, a third target-specific navigation button 512 labeled with resource identifier "Welcome to MSN.com" 514, a fourth target-specific navigation button 516 labeled with resource identifier "MSNBC Cover" 518.

An overflow indicator 520 indicates that other backward navigation targets are available to select from, but there is not enough room on the button bar 502 to display all the target resource identifiers with intelligent backward navigation buttons. The user can select the overflow indicator 520 to reveal more target resource identifiers from which to choose.

In one implementation of the browser window 500, the target-specific navigation buttons 504, 508, 512, and 516, are displayed according to temporal order from left to right (i.e., in order of most recently visited target resource to earliest visited target resource). In other implementations, target-specific navigation buttons may be presented in other orders, such as according to domain name, most visited to least visited, non-temporal, local resources to remote resources, and others.

Figure 6:
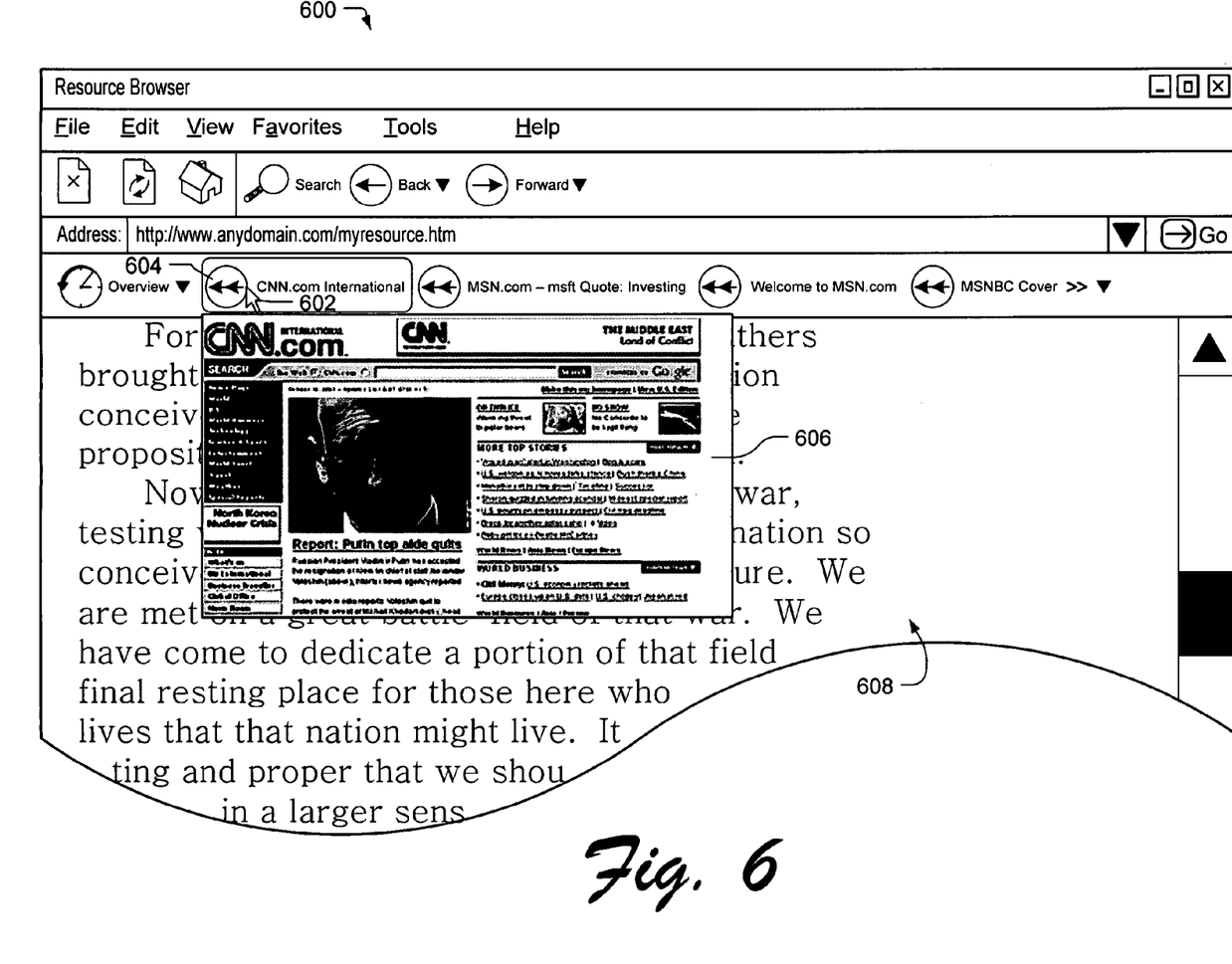
FIG. 6 illustrates another portion of a browser window wherein a pointer icon is being hovered over an intelligent backward navigation button for an intelligent backward navigation target causing a thumbnail of the intelligent backward navigation target to appear.

FIG. 6 illustrates another portion of a browser window 600 wherein a pointer icon 602 is being hovered over a target-specific navigation button 604 causing a thumbnail 606 of the associated target resource to appear. The thumbnail 604 is presented on top of a currently visited resource 608. By hovering over the target-specific navigation button 604 to obtain the thumbnail 606, the user can preview the contents of the associated target resource without actually navigating to the target resource. As discussed above, if the user "clicks" on the target-specific navigation button 604, the browser will navigate to the associated target resource, replacing the resource 608 in the main window with the contents of the target resource.

Exemplary operations for detecting backward navigation targets, designating target resources, and responding to a user selection of the intelligent backward navigation button are discussed in detail with respect to a number of algorithms.

Exemplary Operations

Described herein are exemplary methods for implementing intelligent backward resource navigation. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement intelligent backward resource navigation.

Figure 7:
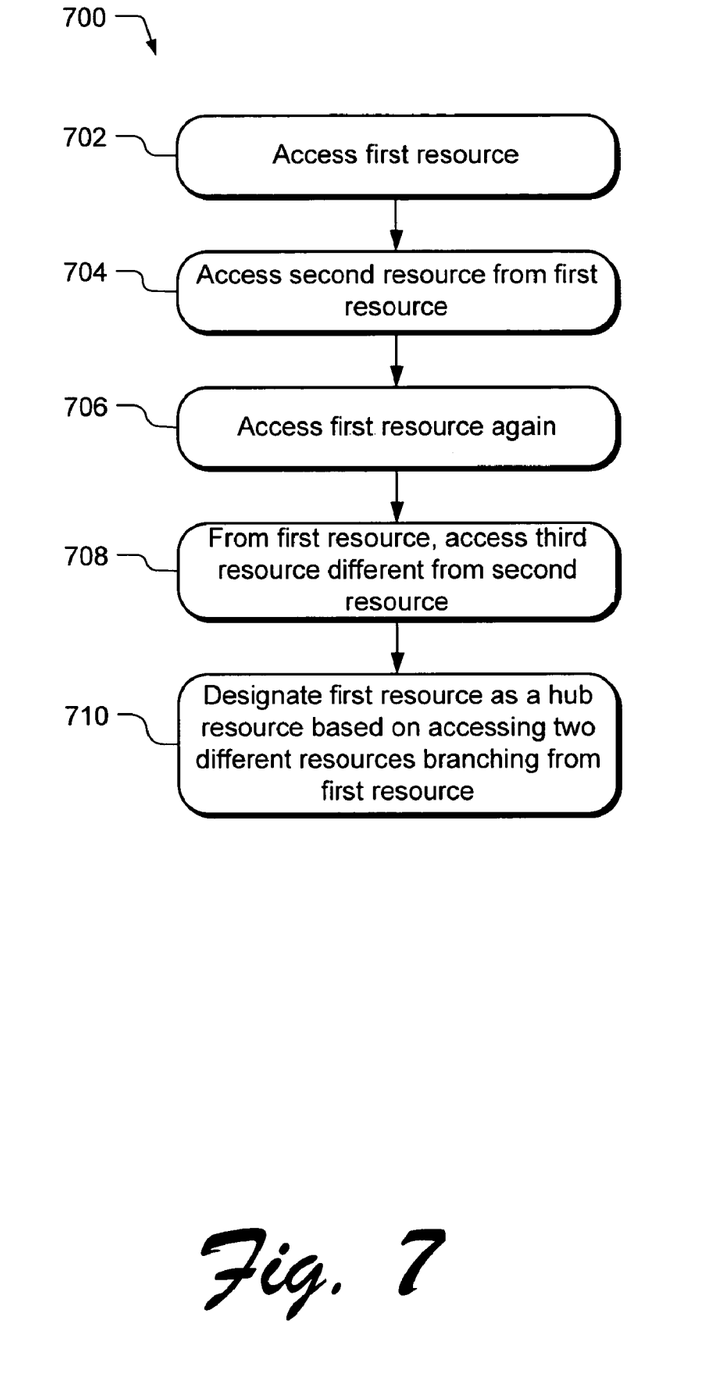
FIGS. 7-8 are flowcharts having exemplary operations for performing intelligent backward navigation.

FIG. 7 illustrates an algorithm 700 having exemplary operations for automatically identifying a hub node in the navigation history and designating the corresponding visited resource as a hub resource (i.e., hub). As discussed above, a hub is one type of backward navigation target that can be targeted for intelligent backward navigation. The algorithm 700 determines whether a resource has been branched from to two other different resources.

A first accessing operation 702 accesses (e.g., navigates to) a first resource. The first accessing operation 702 can occur as a result of the user typing in a resource identifier corresponding to the first resource, the user selecting a resource identifier from a favorites list, the user selecting the first resource from a history of resource identifiers, the user clicking on a hyperlink in another resource pointing to the first resource, or otherwise.

A second accessing operation 704 accesses a second resource from the first resource. The second accessing operation 704 is typically caused when the user selects a hyperlink embedded in the first resource. However, the second resource may be accessed from the first resource in other ways, such as, automatic activation of the resource by a script or other triggering mechanism for activating the second resource from the first one.

A third accessing operation 706 accesses the first resource again. The third accessing operation 706 can be caused by the user selecting a hyperlink to the first resource embedded in the second resource, the user selecting the traditional back button, or by other designated mechanisms for revisiting the previously accessed resource that may be known in the art. In a fourth accessing operation 708, from the first resource, a third resource is accessed that is different from the second resource. Again, the fourth accessing operation 708 may be caused by any navigating mechanism associated with the second resource as may be known in the art. An exemplary mechanism is clicking on a hyperlink in the second resource that points to the fourth resource.

A designating operation 710 designates the first resource visit as a hub node as a result of the accessing operations 702, 704, 706, and 708. The designating operation 710 analyzes the navigating sequence and determines that the first resource was branched from along two different paths. Specifically, navigation first branched from the first resource to the second resource, and subsequently branched from the first resource to the third resource. As such, the first resource visit is designated as a hub node, which can be used as a backward navigation target and the corresponding resource as a target resource for intelligent backward navigation.

Another implementation of a hub detection algorithm involves identifying a navigation node to which the user has navigated along a retraced path from a target resource. The last navigation node in a retraced path and the corresponding resource are designated as a hub. For example, if the user uses the intelligent back button to navigate to a resource and then retraces part of the path (moving forward or backward in the sequence of resource visits in the navigation history), the last node of the retraced path is designated as a new backward navigation target. This implementation is motivated by the recognition that some resources are important even though those resources have not been revisited in the typical hub fashion as described above. If a resource is revisited by retracing a history navigation path, from some other target resource, and then used to navigate to a new resource (not on the retraced navigation path) then the resource is considered important for branching to new resources and designated as a hub.

Figure 8:
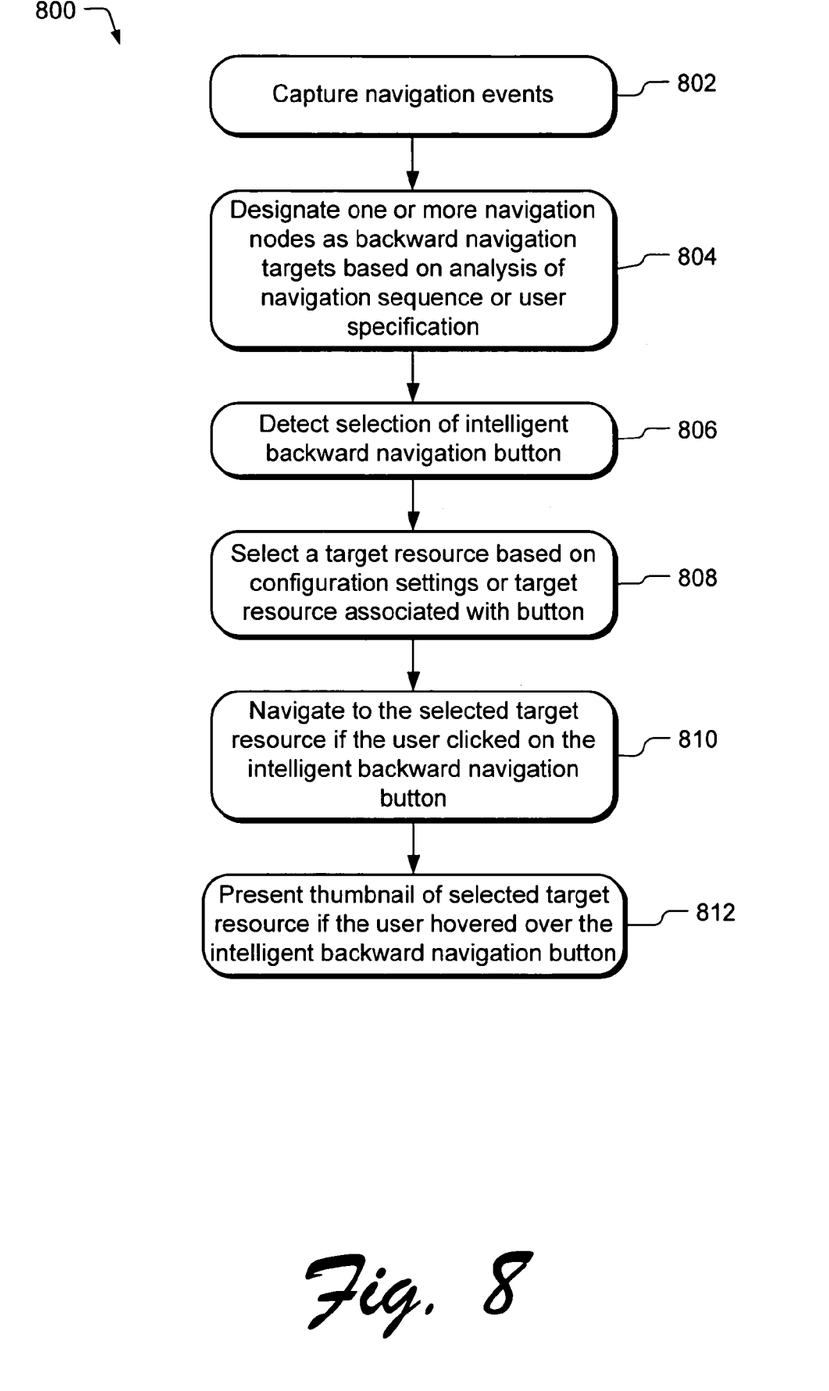

FIG. 8 is an algorithm 800 having exemplary operations for responding to user selection of an intelligent backward navigation button. In general, when the user selects an intelligent backward navigation button, a backward navigation target is identified in a navigation history. As discussed above, backward navigation targets are marked as targets in the navigation history to facilitate later re-visitation of the corresponding target resources.

A capturing operation 802 captures navigation events. Navigation events can include any type of navigation relevant to navigation history, including, but not limited to, resource identifiers corresponding to visited resources, resource branching information, resource navigation sequence information, a tally of the number of visits to each resource, and so on. The navigation events are stored in a navigation history.

A designating operation 804 reads the navigation history and user specifications and designates one or more navigation nodes in the navigation history as backward navigation targets based on the navigation history analysis and the user specifications. For example, if the user specifies that user-typed URLs are to be designated as backward navigation targets, the designating operation 804 marks any user-typed URLs as target in the navigation history. The designating operation 804 also automatically identifies hubs and form submission results and designates the hubs and form submission results as backward navigation targets.

A detecting operation 806 detects user-selection of the intelligent backward navigation button. For example, if the user "clicks" on the intelligent backward navigation button, the detecting operation 806 sends a message to the browser indicating the type of selection.

In response, a selecting operation 808 selects a backward navigation target from the navigation history. The selecting operation 808 can select the target resource based on a target resource identifier associated with the intelligent backward button that was selected, such as in the case of a target-specific backward navigation button. The selecting operation 808 may also select the backward navigation target based on configuration settings, such as a temporal setting. If the user "clicked" on the intelligent backward navigation button, a navigating operation 810 navigates to the selected target resource.

If the user did not "click" on the intelligent backward navigation button, but rather hovered over the intelligent backward navigation button, a presenting operation 812 presents a thumbnail of the corresponding target resource. The presenting operation 812 first retrieves content from the selected target resource. The presenting operation 812 then generates a region for presenting the thumbnail according to user-specified configuration settings.

In one implementation of the presenting operation 812, the thumbnail image is generated at the time the resource is visited, and stored in a thumbnail cache or data store 106. The thumbnail can therefore be displayed at the time the user hovers over the intelligent resource button. In this implementation, the cached or stored thumbnails can be continually or periodically refreshed by navigating to the resource via a hidden browser, rendering and storing a refreshed thumbnail image.

In another implementation of the presenting operation 812, the thumbnail is generated by retrieving the content from the resource. In this implementation, a hidden browser or other facility is used to navigate to the resource, retrieve the content of the resource and generate the thumbnail.

Whether or not a cached resource is used in the presenting operation 812, in one implementation of the presenting operation 812, the thumbnail image of the resource is generated by rendering the content of the resource into a bitmap image. The bitmap image may be scaled down to the size of the desired thumbnail, thereby making the entire resource visible in the thumbnail area. Alternatively, the bitmap image need not be scaled down to fit the desired size of the thumbnail, whereby only a portion of the bitmap image is visible to the user through the thumbnail.

Exemplary Computing Device

Figure 9:
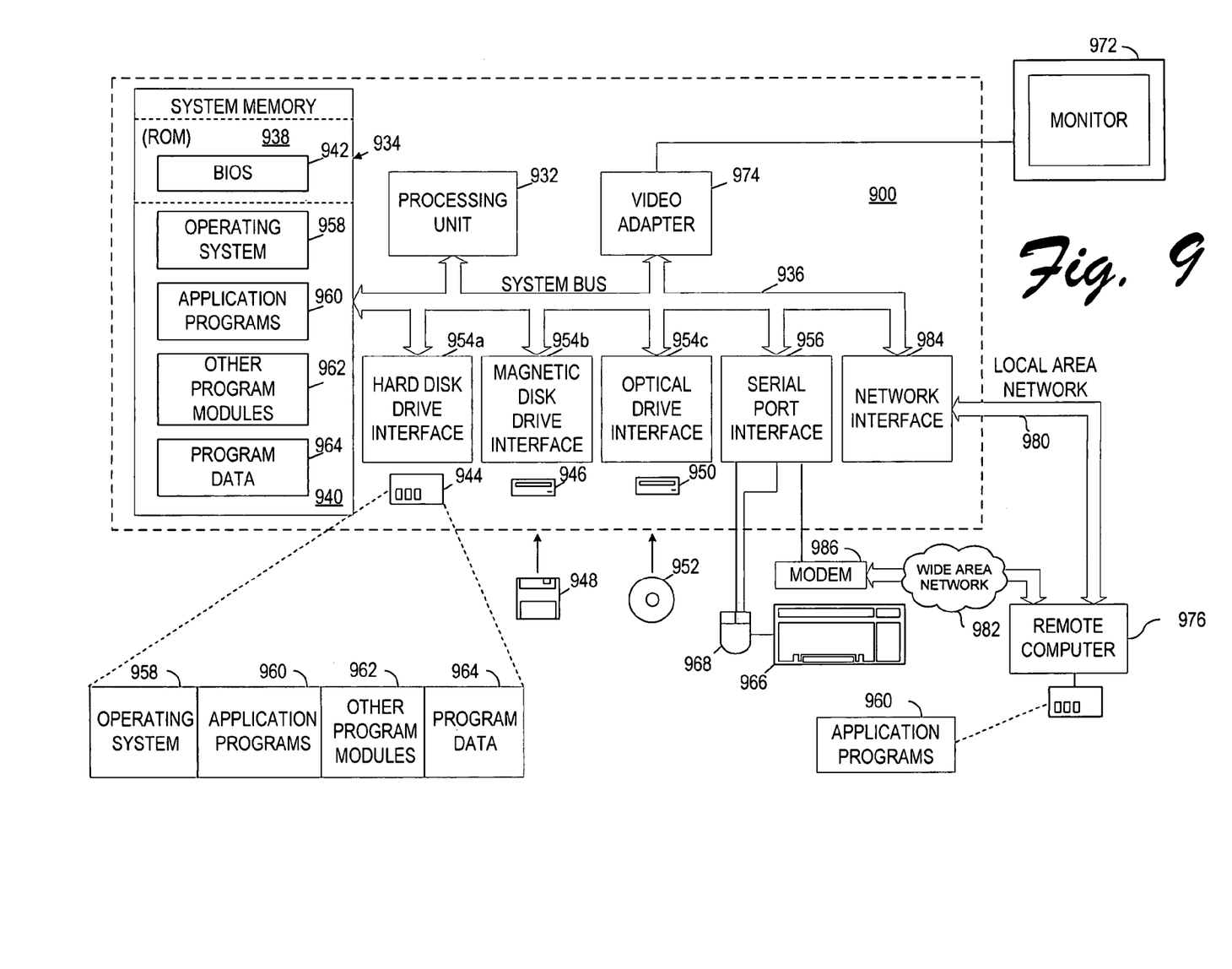
FIG. 9 illustrates a generalized computing device that may be used to implement intelligent backward navigation and browser session overview.

FIG. 9 is a schematic illustration of an exemplary computing device 900 that can be used to implement the exemplary systems, methods, browser window features discussed herein. Computing device 900 includes one or more processors or processing units 932, a system memory 934, and a bus 936 that couples various system components including the system memory 934 to processors 932. The bus 936 represents one or more of any of several types of bus structures, including a memory bus or memory controller, a peripheral bus, an accelerated graphics port, and a processor or local bus using any of a variety of bus architectures. The system memory 934 includes read only memory (ROM) 938 and random access memory (RAM) 940. A basic input/output system (BIOS) 942, containing the basic routines that help to transfer information between elements within computing device 900, such as during start-up, is stored in ROM 938.

Computing device 900 further includes a hard disk drive 944 for reading from and writing to a hard disk (not shown), and may include a magnetic disk drive 946 for reading from and writing to a removable magnetic disk 948, and an optical disk drive 950 for reading from or writing to a removable optical disk 952 such as a CD ROM or other optical media. The hard disk drive 944, magnetic disk drive 946, and optical disk drive 950 are connected to the bus 936 by appropriate interfaces 954a, 954b, and 954c.

The drives and their associated computer-readable media provide nonvolatile storage of computer-readable instructions, data structures, program modules and other data for computing device 900. Although the exemplary environment described herein employs a hard disk, a removable magnetic disk 948 and a removable optical disk 952, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 944, magnetic disk 948, optical disk 952, ROM 938, or RAM 940, including an operating system 958, one or more application programs 960, other program modules 962, and program data 964. A user may enter commands and information into computing device 900 through input devices such as a keyboard 966 and a pointing device 968. Other input devices (not shown) may include a microphone, joystick, game pad, satellite dish, scanner, or the like. These and other input devices are connected to the processing unit 932 through an interface 956 that is coupled to the bus 936. A monitor 972 or other type of display device is also connected to the bus 936 via an interface, such as a video adapter 974.

Generally, the data processors of computing device 900 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 900. At execution, the programs are loaded at least partially into the computing device's 900 primary electronic memory.

Computing device 900 may operate in a networked environment using logical connections to one or more remote computers, such as a remote computer 976. The remote computer 976 may be a personal computer, a server, a router, a network PC, a peer device or other common network node, and typically includes many or all of the elements described above relative to computing device 900. The logical connections depicted in FIG. 9 include a LAN 980 and a WAN 982. The logical connections may be wired, wireless, or any combination thereof.

The WAN 982 can include a number of networks and subnetworks through which data can be routed from the computing device 900 and the remote computer 976, and vice versa. The WAN 982 can include any number of nodes (e.g., DNS servers, routers, etc.) by which messages are directed to the proper destination node.

When used in a LAN networking environment, computing device 900 is connected to the local network 980 through a network interface or adapter 984. When used in a WAN networking environment, computing device 900 typically includes a modem 986 or other means for establishing communications over the wide area network 982, such as the Internet. The modem 986, which may be internal or external, is connected to the bus 936 via a serial port interface 956.

In a networked environment, program modules depicted relative to the computing device 900, or portions thereof, may be stored in the remote memory storage device. It will be appreciated that the network connections shown are exemplary and other means of establishing a communications link between the computers may be used.

The computing device 900 may be implemented as a server computer that is dedicated to server applications or that also runs other applications. Alternatively, the computing device 900 may be embodied in, by way of illustration, a stand-alone personal desktop or laptop computer (PCs), workstation, personal digital assistant (PDA), or electronic appliance, to name only a few.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method comprising:
    detecting navigation to a resource, followed by detecting navigation from the resource directly to a second resource, followed by detecting navigation from the second resource directly back to the resource, followed by detecting navigation from the resource directly to a third resource that is different than the second resource; and
    automatically navigating directly back to the resource from a current resource while skipping intervening resources responsive to selection of a control that is configured to navigate to the resource and to navigate to previously-visited resources other than the resource and the intervening resources,
    wherein the method is performed by a computing device.

2. A method as recited in claim 1 wherein the detected navigations are each performed by a user.

3. A method as recited in claim 1 further comprising storing a uniform resource identifier identifying the resource as a backward navigation target.

4. A method as recited in claim 3 wherein the uniform resource identifier of the resource is available across multiple browser sessions.

5. A method as recited in claim 1 further comprising storing a uniform resource identifier identifying the resource as a backward navigation target among a plurality of backward navigation targets in a navigation history of uniform resource identifiers of a navigation map.

6. A method as recited in claim 1, wherein the control is a button.

7. A method as recited in claim 1 wherein the detecting navigations occur during a first browser session and the automatically navigating occurs during a second browser session.

8. A system comprising:
    a processor;
    a memory including computer-executable instructions that, when executed by the processor, configure the system to:
        detect navigation to a resource, and then detect navigation from the resource directly to a second resource, and then detect navigation from the second resource directly back to the resource, and then detect navigation from the resource directly to a third resource that is different than the second resource;
        designate the resource in a navigate history as a backward navigation target to distinguish the resource from at least some previously-visited intervening resources that are not backward navigation targets; and automatically navigate directly back to the resource from a current resource while skipping the at least some previously-visited intervening resources responsive to selection of a control that does not visually identify the resource.

9. A system as recited in claim 8 wherein the control is a backward navigation button and the instructions further configure the system to present the backward navigation button.

10. A system as recited in claim 8 wherein the instructions further configure the system to store a uniform resource identifier corresponding to each of the resource and the second resource and the third resource in a navigation history according to a temporal order of the detected navigations.

11. A system as recited in claim 10, wherein the instructions further configure the system to store only one uniform resource identifier for the resource corresponding to a most recent visit to the resource.

12. A system as recited in claim 8 wherein the detected navigations are each performed by a user.

13. A system as recited in claim 8 wherein the instructions further configure the system to store a uniform resource identifier identifying the resource as a backward navigation target.

14. A system as recited in claim 13 wherein the uniform resource identifier of the resource is available across multiple browser sessions.

15. A system as recited in claim 8 wherein the instructions further configure the system to store a uniform resource identifier identifying the resource as a backward navigation target among a plurality of backward navigation targets in a navigation history of uniform resource identifiers of a navigation map.

16. At least one computer-readable storage medium including computer-executable instructions that, when executed by a computer, cause the computer to perform a method comprising:

detecting navigation to a resource, followed by detecting navigation from the resource directly to a second resource, followed by detecting navigation from the second resource directly back to the resource, followed by detecting navigation from the resource directly to a third resource that is different than the second resource;

designating the resource in a navigation history as a backward navigation target to distinguish the resource from at least some other resources that are not backward navigation targets; and automatically navigating directly back to the resource from a current resource while skipping intervening resources.

17. At least one computer-readable storage medium as recited in claim 16 wherein the detected navigations are each performed by a user.

18. At least one computer-readable storage medium as recited in claim 16, the method further comprising storing a uniform resource identifier identifying the resource as the backward navigation target.

19. At least one computer-readable storage medium as recited in claim 18 wherein the uniform resource identifier of the resource is available across multiple browser sessions.

20. At least one computer-readable storage medium as recited in claim 16, the method further comprising storing a uniform resource identifier identifying the resource as the backward navigation target among a plurality of other backward navigation targets in a navigation history of uniform resource identifiers of a navigation map.

\* \* \* \* \*